United States Patent

[11] 3,620,353

| [72] | Inventors | Milton E. Foster<br>Palos Verdes Estates;<br>Dimitri A. Gogin, Torrance, both of Calif. |
|---|---|---|
| [21] | Appl. No. | 887,160 |
| [22] | Filed | Dec. 22, 1969 |
| [45] | Patented | Nov. 16, 1971 |
| [73] | Assignee | McDonnell Douglas Corporation |

[54] CHAIN-DRIVE CARGO-HANDLING SYSTEM
2 Claims, 6 Drawing Figs.

| [52] | U.S. Cl. | 198/160 |
|---|---|---|
| [51] | Int. Cl. | B65g 15/00 |
| [50] | Field of Search | 198/160, 127, 173 |

[56] References Cited

UNITED STATES PATENTS

| 2,932,380 | 4/1960 | Alvey, Jr. et al. | 198/173 X |
| 2,990,941 | 7/1961 | Peras | 198/173 X |
| 3,252,563 | 5/1966 | Juengel | 198/160 X |
| 3,506,110 | 4/1970 | Paul et al. | 198/160 X |

*Primary Examiner*—Joseph Wegbreit
*Assistant Examiner*—H. S. Lane
*Attorneys*—Walter J. Jason, Donald L. Royer and Robert O. Richardson ABSTRACT: A chain-drive cargo-handling system within the cargo deck of an aircraft in the form of a conveyor mechanism involving an endless chain assembly continuously operated by a suitable motor. The chain comprises a plurality of interconnected rollers with support pads which are raised by inflatable tubes positioned thereunder to cause uniform frictional pressure contact to the bottom surface of cargo pallets to be moved on support rollers from station to station on the cargo deck. The frictional engagement of the support pads with a cargo container moves it to the next station on support rollers. Each station has its own inflatable tube to be inflated and deflated as desired to move or halt the movement of the pallets along the cargo deck. A latch system is interlocked to the drive system for quickly locking down the containers for pallets when they reach selected positions on the cargo deck and to deflate tubes at those stations to release the drive system from the locked pallets.

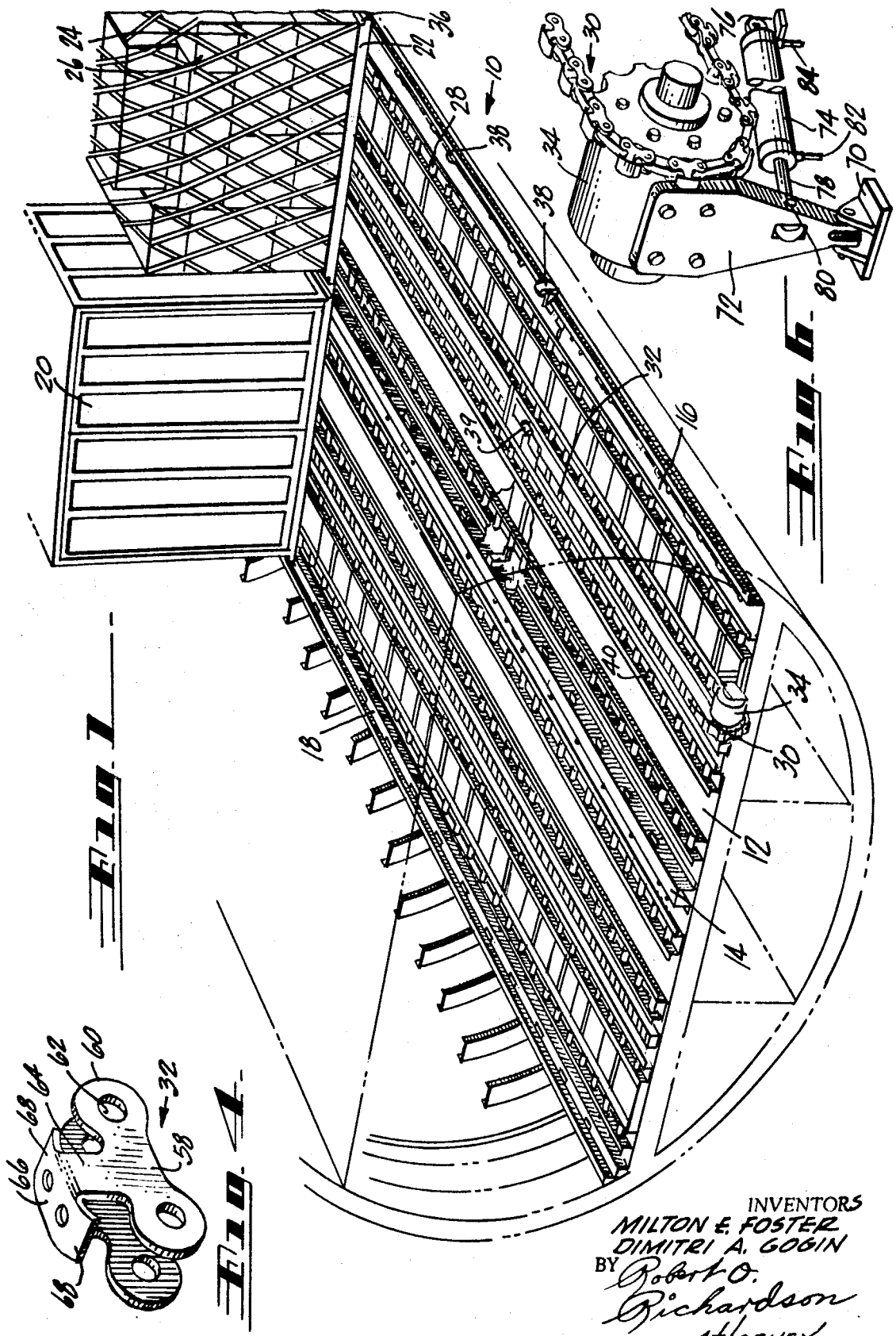

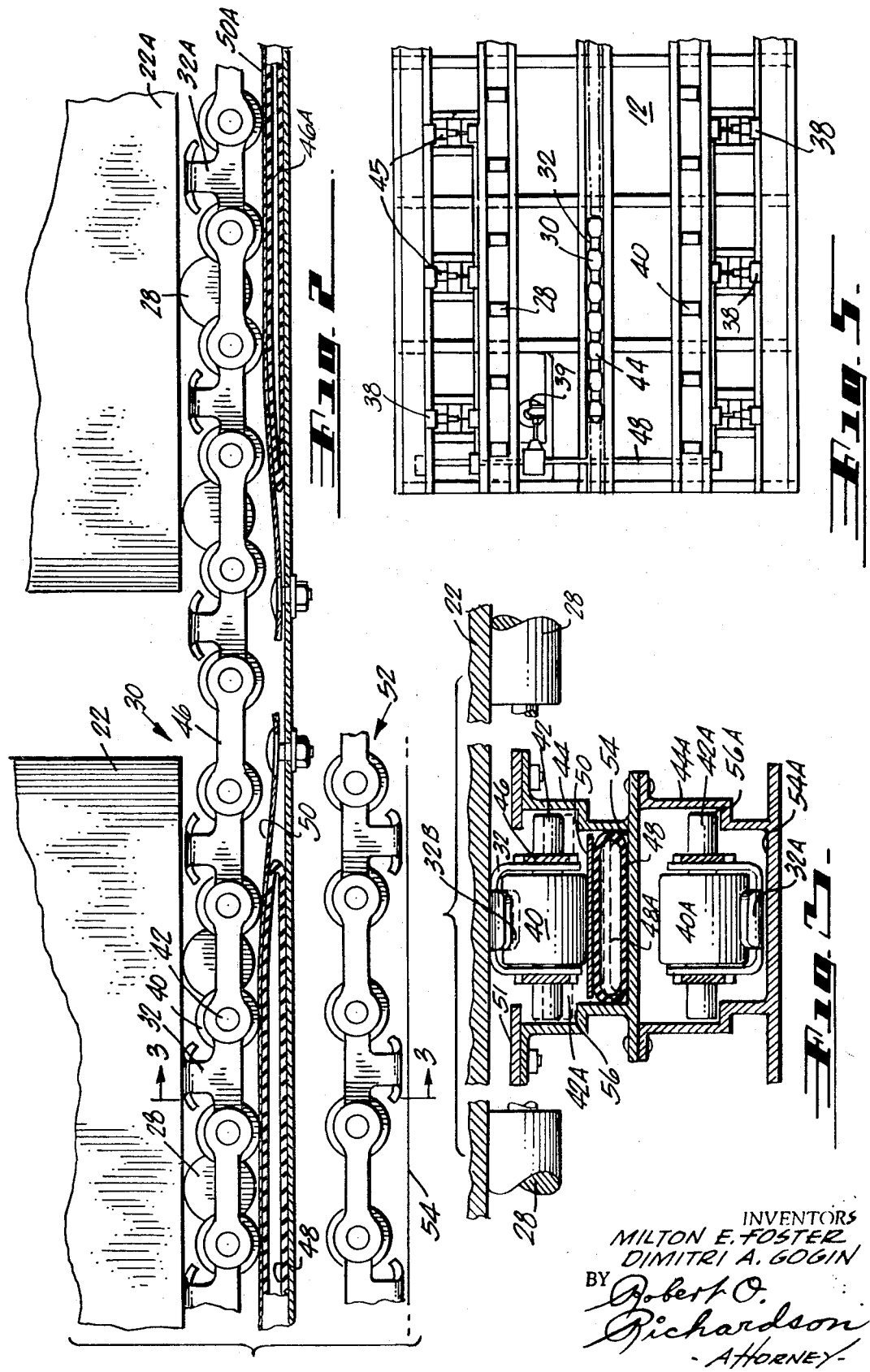

CHAIN-DRIVE CARGO-HANDLING SYSTEM

BACKGROUND OF THE PRESENT INVENTION

Cargo aircraft proposed for future use face several loading problems. The aircraft diameter must be as small as possible in order to have a minimum of aerodynamic drag. This calls for minimum spacing around the payload so that no walkways are permitted for access to the cargo restraint systems. During the turnaround time of the aircraft, manpower requirements must be as small as possible to achieve and yet the time be held to a minimum to achieve the best profit realization for the aircraft. Preferably, aircraft loading and unloading should be less time than is required for other servicing of the aircraft.

A cargo-loading and restraint system has been provided wherein a plurality of containers or pallets for cargo are moved along an aircraft cargo deck to selected positions where they are locked into position for aircraft flight. This system is set forth in copending application Ser. No. 887,124 having a common assignee. The multiple positions are interlocked to provide a sequencing function so that as a pallet reaches the rearwardmost selected position, a selector switch causes the latching pawls to operate to lock the pallet in position and to cause the loading apparatus to stop the next pallet at the station next preceding that one. When the container comes into the selected storage position, the latch pawls engage the container and this sequence of events continues until all desired positions are filled with cargo. The unlatching and moving function can be selected for any sequence of containers or pallets starting from the front of the airplane. This is accomplished by means of selector switches on an operator's panel mounted conveniently within the aircraft or on ground support equipment to be used therewith. As the unlatched function takes place, the cargo-loading drive system automatically engages the selected containers and unloads them. The remaining load in the aircraft may be repositioned as desired by using the proper selection of latch and unlatch switches. By using this system, by way of example, the complete unload-load cycle for 26 8-foot×8-foot×10-foot containers or pallets weighing approximately 12,500 pounds each can be accomplished by one man in less than 20 minutes.

SUMMARY OF THE PRESENT INVENTION

The chain drive cargo-handling system comprising the present invention includes the use of support rollers over which loaded cargo pallets are moved from station to station on the cargo deck of a vehicle or loading facility. In addition, an endless chain drive is provided for moving the pallets on the support rollers. Integral support pads on the chain are raised up to cause a uniform frictional contact with the bottoms of the pallets when movement is desired and lowered free from contact when the pallets have reached their selected stations. The chain drive is continuously operated during the loading and unloading operation.

The raising and lowering of the support pads is done with sections of inflatable tubing beneath the chain rollers. The inflation and deflation of the tubing may be done hydraulically or pneumatically and may be programmed automatically in accordance with the position of the cargo pallets or it may be operator controlled as desired.

The support pads on the continuously driven chain are integrally formed for strength and reliability. Guides are provided on the chain return channel to keep the pads from dragging. A resilient wear strip is placed on the tubing over which the chain rollers pass to distribute the weight over the tubes and to prevent wear on them.

BRIEF DESCRIPTION OF THE DRAWINGS

FIG. 1 is a perspective view showing the cargo-handling system on the aircraft floor;

FIG. 2 is a longitudinal sectional view through the chain and chain-lifting apparatus;

FIG. 3 is a transverse sectional view through the chain and chain-lifting apparatus;

FIG. 4 is a perspective view of a pallet lift pad;

FIG. 5 is a fragmentary plan view showing the relationship between the chain and latching means; and FIG. 6 is a partial perspective view of the chain tension regulator.

Referring now to FIG. 1 there is shown in phantom an outline of an aircraft fuselage 10 having a floor 12 upon which is installed the chain drive cargo-handling system of the present invention. A centerline divider strip 14 and guide rails 16 and 18 define separate cargo-handling systems. A cargo container 20 and a cargo pallet 22 with cargo straps 24 for containing a plurality of irregular cargo objects 26 illustrate typical cargo units to be loaded. Between centerline divider strip 14 and guide rail 18 are four rows of rollers 28 for supporting pallet 22. Centrally positioned is an endless chain 30 on which are mounted support pads 32 for engagement with the undersurface of pallet 22 to move it along the floor 12 to its stored position. A chain drive motor 34 causes the endless chain to move continuously, although provision is made for the pads 32 thereon to become depressed and out of engagement with those pallets that are in their designated stored position. The engagement and disengagement of the pads with the undersurface of the pallet 22 may be done, for example, by raising and lowering of the chain 30 by means of an inflatable tube thereunder. This tube, when inflated, causes the pads to contact with a uniform frictional pressure and move the pallet and, when deflated, permits the pads to become disengaged while the pallet rests on the support rollers 28. Pallet 22 has a plurality of recesses 36 for engagement with cargo pallet restraint brackets 38, positioned along guide rail 18 and centerline divider strip 14 to hold the pallets in position. These restraint brackets move inwardly into the recesses 36 of the pallet by an electric motor 39 through a drive shaft system which drives all cargo pallet restraint brackets 38 inwardly at selected stations to restrain securely those pallets positioned at those stations. Similar apparatus is positioned on the floor 12 between centerline divider strip 14 and rail 16 for the movement and restraint of cargo pallet 22.

Sectional views, longitudinal and transverse, of the endless chain 30 and the manner in which it selectively engages and moves pallets 22 are shown in FIGS. 2 and 3. Here there are shown rollers 40 mounted on trunnions 42 extending outwardly to serve as guides within roller channel 44. Chain links 46 on each side of the rollers interconnect successive rollers in the chain. Between adjacent sets of links are support pads 32 which will be seen more clearly in FIG. 4. These pads, links and rollers form a continuous chain drive that is continuously operable during the cargo-moving operation. Within the roller guide 44 and disposed in the bottom thereof are inflatable tubes 48. These tubes are in sections of about the same length as the pallets and each defines a storage station. Over each station is a resilient plate 50 over which the rollers 40 move. As shown at the left in FIG. 2, when the tube 48 is inflated, it raises the plate 50 up so that the connecting pad 32 frictionally engages the bottom surface of pallet 22 and, although the bulk of the weight continues to be supported by the support roller 28, the movement of the chain acts as a drive in moving the pallet 22. As shown at the right in FIG. 2, pallet 22 continues to rest on rollers 28 but with the tube 46a deflated the roller plate 50a is depressed and pad 32a is not in engagement with the pallet 22a. In this manner, although the chain 30 continues to move, the pallet 22a does not.

In an alternate embodiment for selected applications where faster movement of lighter weight cargo is desired, a chain of links 46 and without pads 32 may be used. Rollers 28 also would be optional so long as cargo 22 may rest on a deck having a plane at the same level as the plane of the top surface of rollers 28. In this case when the chain 30 is raised, the top of chain rollers 40 engage pallets 22 and move them at twice the speed.

A portion of the return half of the endless chain drive of the illustrative embodiment is shown in FIG. 2 and identified by arrow 52. The pallet contact portion of the contact pad 32 is upside down and provision must be made to keep it elevated from surface line 54 to prevent frictional scrapping or dragging.

Reference is made to the transverse vertical sectional view in FIG. 3. Here the top surface of rollers 28 define the plane upon which pallet 22 rests. Roller guide channel 44 is of substantially U-shaped configuration with shoulders 56 supporting trunnions 42 when tube 48 is deflated. These trunnions preferably have bearing surfaces rotatable relative to the chain links 46. Tube 48 is positioned on the bottom surface 54 with plate 50 positioned thereover for engagement with rollers 40 when tube 48 is deflated. Strips 51 prevent accidental dislodgement of the chain or foreign objects falling into the guide channel. A second roller guide channel 44a is used to house the return portion of the chain. Depending upon available space this return channel may be spaced within the same plane as the first or it may be placed under the first as shown. It also has a shoulder 56a on which the trunnions 42a are carried to keep the contact pad 32a from dragging along the bottom surface 54a.

In FIG. 3, the tube 48 is shown in its inflated position and contact pad 32 is engaging the undersurface of pallet 22 which is carried by rollers 28. When deflated, tube 48 becomes flattened to the position shown in dashed lines 48a and trunnion 42 is lowered to the dotted-line position 42a and the contact pad 32 is lowered to its dotted-line position 32b.

The contact pad 32 is shown in perspective in FIG. 4. Since it replaces links 46 in alternate sections of the chain 30, it has a pair of connecting link sections 58 which terminate in ends 60 having apertures 62 therein. These apertures permit its positioning over trunnions 42 in the chain. The two connecting link sections 58 have upstanding spacer walls 64 interconnecting by a pallet contacting cross plate 66. This plate 66 has curved lip edges 68 so that it may engage the bottom of pallet 22 without damage. Plate 66 is raised from trunnion 42 greater than the radius of roller 40 so that the plate, and not the roller, supports the pallet. Preferably, pad 32 is integrally formed from a flat blank suitably punched and formed in a manner well known in the art.

In FIG. 5 there is shown a plan view of the aircraft floor 12 of one station for pallet storage. Pallets have been standardized to be 8 feet in width by 10 feet in length or multiples thereof. Within the 10-foot length are six restraint brackets 38 on each side for engagement with the pallet. These brackets are simultaneously operated by motor 39 through a shaft system 48 which operates a driving mechanism such as a screwjack 45 for each bracket. As motor 39 turns shafts 48, the brackets 38 move inwardly to engage the pallet or move outwardly to disengage the pallet, depending upon the actuation of suitable switches. The protecting plate 44 is shown upon which the rollers 40 of the endless chain 32 pass in either elevated position to move the pallet or in recessed position to permit passage of the drive chain without causing the cargo to move.

In FIG. 6 there is shown a chain tension regulator. In one embodiment of this invention a 200-foot cargo deck is used in a cargo aircraft. The endless chain is about 400 feet long. Moving heavy cargo in one direction resulted in a chain slack of about 6 feet. To prevent jamming, the overall length of the chain drive system must be made to vary according to various load conditions. To accomplish this, drive motor 34 at one end of the system is pivotally mounted to a base bracket 70 by a pivot plate 72. A hydraulic cylinder 74 is mounted on a base bracket 76 with piston rod 78 pivotally attached to the plate 72 at pivot point 80. Hydraulic lines 82 and 84 are connected to a hydraulic pump, not shown, for actuation of piston rod 78 in regulating the tension on chain 30. An appropriate sensor, not shown, senses the effort of the motor (horsepower output by electrical current or hydraulic pressure) and then the tension is regulated accordingly.

Having thus described an illustrative embodiment of the present invention, it is to be understood that modifications thereof will become apparent to those skilled in the art and it is to be understood that these deviations are to be construed as part of the present invention.

We claim:

1. A continuous chain drive cargo-handling system comprising:

a first base plane upon which cargo is positioned, an endless chain assembly of a plurality of interconnected rollers, a plurality of inflatable tube sections each representing a cargo station, said tube sections being positioned under said rollers, said sections when inflated being operable to raise said rollers and thus said chain assembly into frictional contact with the bottom surface of said cargo to move said cargo from inflated sections, resilient wear strips over said tube sections upon which said rollers are supported when said tube sections are inflated, said chain assembly having rollers connected by links and by contact pads, said pads having link sections with apertures at the ends thereof for trunnion mounting, said link sections having upstanding walls and a connecting plate positioned in a plane above the top roller surface of said rollers, trunnions rotatably mounted within said link section apertures, said trunnions having extensions extending outwardly from said link sections, and chain guide means for supporting said trunnion extensions when said tube sections are deflated.

2. A continuous chain drive cargo-handling system comprising:

a first base plane upon which cargo is positioned, an endless chain assembly of a plurality of interconnected rollers, a plurality of inflatable tube sections each representing a cargo station, said tube sections being positioned under said rollers, said sections when inflated being operable to raise said rollers and thus said chain assembly into frictional contact with the bottom surface ok said cargo to move said cargo from inflated sections, resilient wear strips over said tube sections upon which said rollers are supported when said tube sections are inflated, and chain guide means comprising a base upon which said tube sections are positioned and shoulders in upstanding guide walls to support trunnions on said chain assembly when said tube sections are deflated.

* * * * *

PO-1050
(5/69)

UNITED STATES PATENT OFFICE
CERTIFICATE OF CORRECTION

Patent No. 3,620,353     Dated 16 November 1971

Inventor(s) Milton E. Foster and Dimitri A. Gogin

It is certified that error appears in the above-identified patent and that said Letters Patent are hereby corrected as shown below:

In Column 3, Line 11, "deflated" should be changed to read <u>inflated</u>.

Signed and sealed this 23rd day of May 1972.

(SEAL)
Attest:

EDWARD M. FLETCHER, JR.                    ROBERT GOTTSCHALK
Attesting Officer                          Commissioner of Patents